UNITED STATES PATENT OFFICE.

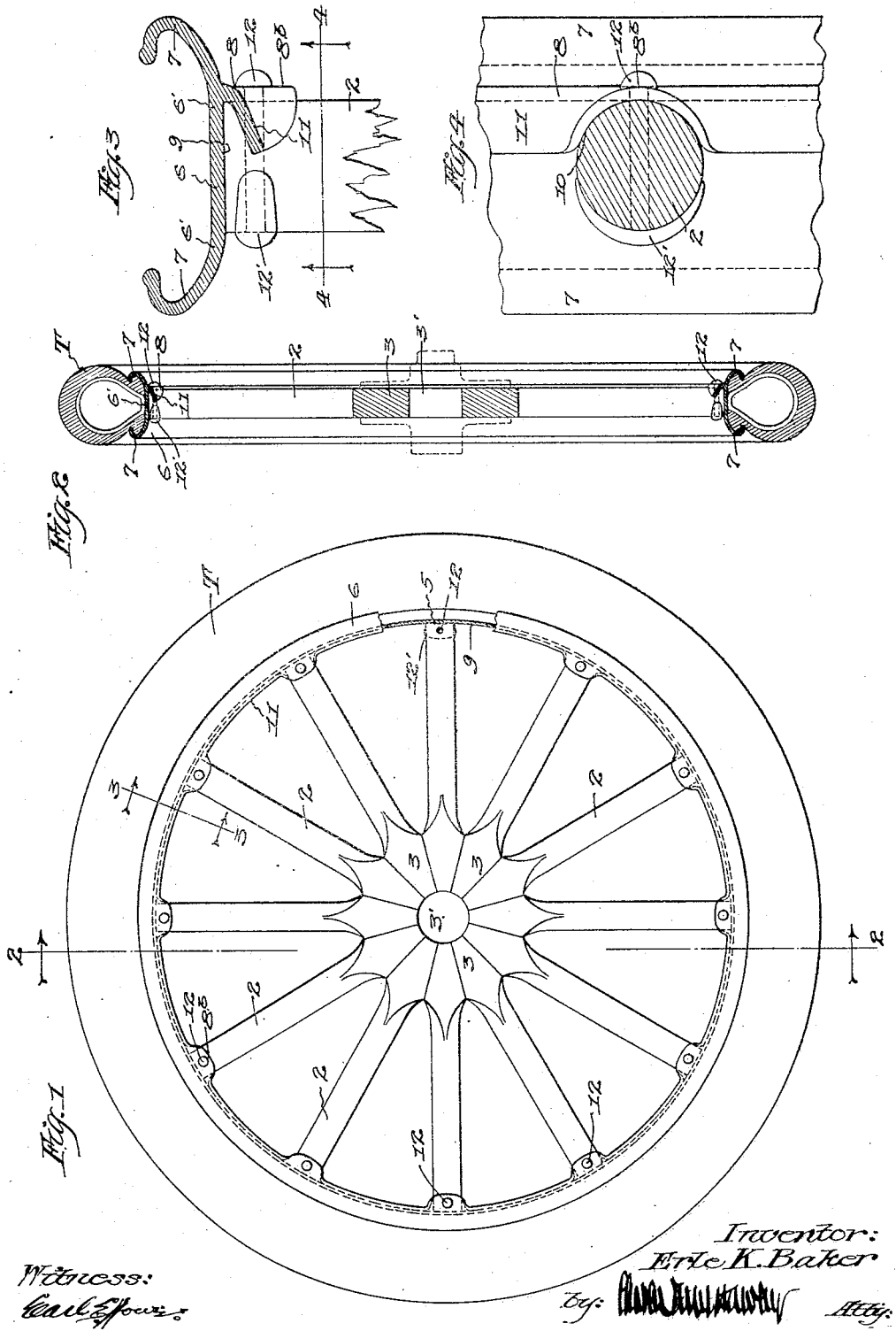

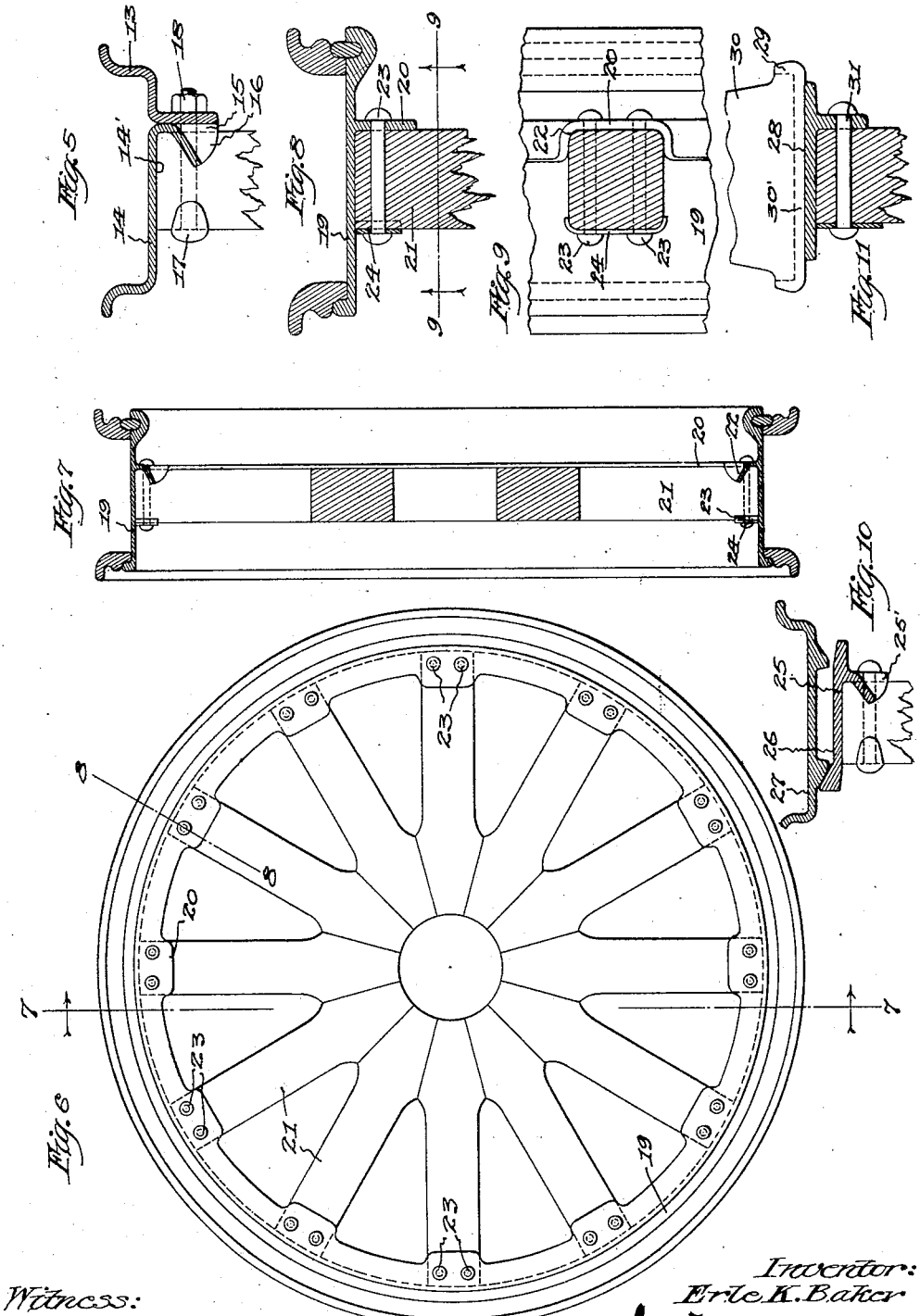

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

TIRE-CARRYING WHEEL FOR MOTOR-VEHICLES.

1,336,337.  Specification of Letters Patent.  Patented Apr. 6, 1920.

Application filed November 14, 1918. Serial No. 262,554.

*To all whom it may concern:*

Be it known that I, ERLE K. BAKER, a citizen of the United States, and a resident of Chicago, county of Cook, and State of Illinois, have invented certain new and useful Improvements in Tire-Carrying Wheels for Motor-Vehicles, of which the following is a specification.

The invention relates to improvements in motor vehicle wheels of the kind which have fixed rims, the latter being variously formed to receive and hold rubber tires of the solid or the pneumatic types, according to use.

The object of my invention is to simplify the construction of such wheels; to lessen the number of parts therein; to increase the strength thereof; to enhance the resilience; to increase their durability; to render them immune from the effects of changing climatic conditions; to lessen the weight of such wheels, and to materially reduce the cost thereof, and the time and labor required for their manufacture.

My invention resides in a wheel wherein these objects are attained, and the construction, functions, and merits of which will be understood from the accompanying drawings and the following description.

In said drawings, Figure 1 depicts my improved wheel in a form adapted to receive a standard clencher tire;—Fig. 2 is a section on the line 2—2 of Fig. 1;—Fig. 3 is an enlarged cross section of the rim portion of the wheel with the tire removed, and on the line 3—3 of Fig. 1;—Fig. 4 is a section on the line 4—4 of Fig. 3, viewed in the direction of the arrow;—Fig. 5 is a sectional view, like unto Fig. 3, but showing a component rim of the Q. D. type;—Fig. 6 is a side view of a wheel embodying my invention as adapted for use with a "Giant" pneumatic tire;—Fig. 7 is a section on the line 7—7 of Fig. 6;—Fig. 8 is an enlarged section on the line 8—8 of Fig. 6;—Fig. 9 is a section on the line 9—9 of Fig. 8;—Fig. 10 illustrates a further form that the fixed rim portion of the wheel may take; and, Fig. 11 shows still another form or shape thereof.

The parts, 2, 2, appearing in the several figures of the drawings, are wooden spokes. These have mitered butts, 3, which together comprise the wooden hub center of the wheel and contain the hub hole, 3'. The metal hub is shown by dotted lines in Fig. 2. Each radial wooden spoke terminates in a slightly arched flat or substantially flat end surface, 5, which preferably is of the full cross section of the spoke; instead of being tenoned, as is usual.

It will at once be noted that my wheel has no wooden felly nor a felly band; and no part which corresponds thereto in relation to the spokes and the rim. Instead I employ a single metal part which constitutes the rim proper and at the same time takes the place of and performs all the useful functions of the old style felly and fellyband. This single metal part is supported directly upon the ends of the radial wooden spokes; and therewith completes the wheel. As will be explained, the metal rim part is pressed or shrunk upon the spokes and thus is most firmly bound thereon. Relatively minute fastenings are added by way of precaution, as hereinafter explained; but the circumferential tension and consequent frictional engagement of the metal rim upon the wooden spokes affords the best part of the strength of engagement between them. Incidentally the metal rim completely seals the end grain of the wooden spokes, through serving as the cover or cap for each thereof; which greatly adds to the life of the wheel.

Referring now to Figs. 1 to 4:—The tire-holding rim, 6, is made of a special rolled section of steel, and it is placed directly upon the ends of the wooden spokes, 2, and is fixed thereon by novel means, of an added or precautionary nature, as before mentioned. The rim in this case is of the familiar clencher type, being distinguished by the inwardly turned clencher flanges, 7, which are integral with the base portion, 6', of the rim. Being of the clencher form, the rim, 6, is suited to receive and hold a clencher tire, T. Except for this standard relation to the tire, the rim, 6, is totally different from all others that have been produced in the art; in that it has an integral flange, 8, which extends inwardly from the inner periphery, 9, of the rim; and this flange is also shaped in a novel manner, which adapts it to serve as a device that spaces the spokes circumferentially and as a fastening or anchorage between the spoke-ends and the rim, 6. Furthermore, the position of the flange, 7, has a peculiar relation to the body of the rim and to the spoke-ends; to-wit, the integral flange, 8, is placed near the outer flange, 7, of the rim, as distinguished from a position at the middle of the rim, and thus is in position to engage the outer faces or sides of the wooden spokes to resist the axially directed thrust or stress which tends to displace the rim upon the spokes.

The flange, 8, preferably is made perpendicular to the body of the rim, or substantially so, the operation of mill-rolling the rim stock or shape being thereby facilitated. It will be understood that such stock or shape, received from the mill in flat condition, is "hooped up" and rolled in a rim rolling machine of conventional form. Also that the initial open ring thus formed, is immediately welded to complete an endless ring which is then finally rolled to the clencher shape, or to a straight side shape, if that be desired. At that time the part, 8, appears as an endless flange or deep rib upon the inner periphery of the rim body. After reaching this stage, the flange 8 is acted upon by dies which deform the flange and give it the cross-sectional shape best indicated in Figs. 1, 3 and 4; that is, it is formed into a series of inwardly opening spoke sockets, 10, which are circumferentially spaced about the rim, and into an equal number of intermediate portions, 11, all obviously integral with the base body of the rim. The portions, 10, receive the spokes and the portions, 11, give the wheel the appearance of having a felly. Specifically the face portions, 8ᵇ, of the flange are left in perpendicular relation to the inner periphery of the rim and hence in position to snugly fit the sides of respective spokes, 2; whereas, the intermediate portions, 11, are bent back beneath the body of the rim, preferably upon arcs which conform to the curvature of the body of the rim, as well shown in Fig. 1. The spoke sockets may be curved, rectangular or other shape as determined by the cross-sectional shape of the spokes, 2.

When the parts are assembled, the spoke sockets circumferentially space the spoke ends about the rim, 6, and also provide the many positive driving connections between the spokes and the rim, thus greatly augmenting the strength of the frictional engagement between those parts.

As a further precautionary measure, I bind each spoke end in its spoke socket in a positive manner; as by means of a rivet, 12, which passes through the spoke and through the face portion, 8ᵇ, of the flange, 8. Preferably each rivet has a T-head, 12′, which wraps about the inner side of the spoke. The spoke end being in this manner grasped and practically encompassed by metal, is prevented from splitting or cracking.

Thus I complete a wheel of little weight at the periphery and of great simplicity, strength, resiliency and durability; the same comprising a desired number of wooden spokes and a single metallic peripheral member; to which may be added one small rivet, screw, or bolt per spoke.

The remaining figures of the drawings are intended to show how readily my wheel may be suited to the requirements of different tires. Thus some pneumatic tires, particularly those of large size, require a rim having one flange which may be removed in order that the tire may be pushed axially onto and off the rim. Such rims have detachable side flanges and are known as "quick detachable" rims.

Fig. 5 depicts a wheel construction which provides a satisfactory substitute for a quick detachable rim. As there shown, 13 is the detachable flange of the rim; 14 is the body or main portion of the rim; which in this case is provided with an inwardly turned flange, 15, like unto the previously described flange, 8, and similarly deformed to provide the spoke sockets 16. As shown, the endless body portion, 14, presents its inner periphery, 14′, to the ends of the spokes. In lieu of the previously described rivets, I employ T-headed bolts, 17, having nuts, 18, on their outer ends which serve to hold the detachable flange, 13, in place and simultaneously secure the wooden spokes against displacement in their spoke sockets.

Figs. 6 to 9 represent my complete wheel, as suited to a metal Q. D. rim, 19, of a better known kind. The only modification which I make in the rim proper is to provide it with a flange, 20, deformed and socketed in precisely the manner before described, for engagement with the wooden spokes, 21; but in this case the sockets, 22, (see Fig. 9) are rectangular in formation as required to fit spokes which are rectangular in cross section. For heavy truck wheels, such as this, I prefer that each spoke shall be finally fastened in its socket by means of two rivets, 23, that pass through a metal backing plate, 24, and through the wooden spoke and the deformed flange, 20.

That my invention is not restricted to a circumferential member which is provided with direct or integral tire-holding flanges, is sufficiently indicated in Figs. 10 and 11. In Fig. 10 it will be seen that the metal peripheral member, 25, has an outer periphery, 26, which is suited to receive a demountable tire-holding rim, 27, the latter being shown by dotted lines. The member, 25, is provided with the integral, deformed and socketed flange, 25′, now made familiar by the foregoing description. In Fig. 11 the construction is much the same as that shown in Fig. 10, except that the outer periphery, 28, of the tire-carrying rim member, 29, is cylindrical and hence adapted to receive a pressed-on standard solid rubber tire, 30, having the usual metal tire base, 30′.

In constructing these wheels I first form the circumferential or peripheral metal member and sockets or deform its inner peripheral flange as hereinbefore described; incidentally "sizing" (either stretching or compressing) the member to a uniform circumferential dimension as is common in the present-day manufacture of tire rims and bases. I then follow preferably one or the other of two methods of assembly which I have devised. Under the first method and having assembled the spokes in correct number and radial relation, I drive or forcibly press the wooden body thus formed into the circular rim member, taking care that the spokes shall "land" in the sockets thereof; following which the spokes are bored and the bolts or rivets, or both, are secured therein, which action completes the wheel. Under the second method, the operation is modified to the extent of heating the metal rim to temporarily increase its circumference and thus facilitate its assembly with the spokes. In both cases the rim is left in strong circumferential tension, even after the spoke miters have been driven firmly inward and together. This inward driving of the spokes by the action of the encompassing rim not only results in the formation of a wheel of great initial rigidity at the hub, but also insures the permanent maintenance of such rigidity or solidity in the hub portion of the wheel, as well as insuring a permanent and close butt-joint between the end of each spoke and the peripheral metal member.

Having thus described my invention, I claim as new and desire to secure by Letters Patent:

1. A semi-wood wheel having wooden spokes, in combination with a metal peripheral tire carrying rim member which is provided with an integral flange upon its inner periphery and set back from its outer edge, which flange is deformed to fit and provide sockets for the ends of said spokes, substantially as described.

2. A semi-wood wheel having wooden spokes, in combination with a metal peripheral tire-carrying rim member which is provided with an integral flange upon its inner periphery and set back from its outer edge, which flange is deformed to fit and provide sockets for the ends of said spokes, and to provide circumferentially intermediate bent-back portions that give the wheel the appearance of having a felly, substantially as described.

3. A semi-wood wheel having wooden spokes, in combination with a metal peripheral tire-carrying rim member of a special rolled shape which is provided with an integral flange upon its inner periphery and set back from its outer edge and which flange is deformed to fit and provide sockets for the ends of said spokes, and to provide circumferentially intermediate bent-back portions that give the wheel the appearance of having a felly, substantially as described.

4. A semi-wood wheel having wooden spokes, in combination with a metal peripheral tire-carrying rim member which is provided with an integral flange upon its inner periphery and set back from its outer edge, which flange is deformed to fit and provide sockets for the ends of said spokes, and to provide circumferentially intermediate bent-back portions which give the wheel the appearance of having a felly and metal precautionary fastenings which positively attach the spoke ends to the respective socket portions of said flange.

5. A semi-wood wheel having wooden spokes, in combination with a metal peripheral tire-carrying rim member of wrought metal which is provided with an integral flange upon its inner periphery and set back from its outer edge, said rim being tensioned directly upon the ends of said spokes, and means securing the spokes to said flange in circumferentially spaced relation.

In testimony whereof, I have hereunto set my hand this 31st day of October, 1918.

ERLE KING BAKER.